(12) United States Patent
Chen et al.

(10) Patent No.: US 10,386,887 B2
(45) Date of Patent: Aug. 20, 2019

(54) HEAD-MOUNTED DISPLAY DEVICE

(71) Applicant: Quanta Computer Inc., Taoyuan (TW)

(72) Inventors: Chun-Lung Chen, Taoyuan (TW);
Kok-Kan Chan, Taoyuan (TW);
Kin-Cheong Chan, Taoyuan (TW);
Ko-Chun Wang, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 16/026,594

(22) Filed: Jul. 3, 2018

(65) Prior Publication Data

US 2019/0212772 A1    Jul. 11, 2019

(30) Foreign Application Priority Data

Jan. 11, 2018  (TW) .............. 107101096 A

(51) Int. Cl.
*G02B 27/00* (2006.01)
*G06F 1/16* (2006.01)

(52) U.S. Cl.
CPC ............ *G06F 1/163* (2013.01); *G06F 1/1656* (2013.01)

(58) Field of Classification Search
CPC ............ G02B 27/0176; G02B 27/0179; G02B 2027/0154; G02B 2027/0178; G06F 1/163; G06F 1/1656
See application file for complete search history.

(56) References Cited

U.S. PATENT DOCUMENTS

| | | | |
|---|---|---|---|
| 5,486,841 A * | 1/1996 | Hara | G02B 7/12 345/8 |
| 6,767,095 B1 * | 7/2004 | Altelaar | G02C 7/16 351/44 |
| 10,228,727 B1 * | 3/2019 | Pickett | G06F 1/163 |
| 2018/0055202 A1 * | 3/2018 | Miller | G02B 27/0176 |
| 2018/0246335 A1 * | 8/2018 | Ushakov | H04N 5/225251 |
| 2018/0295733 A1 * | 10/2018 | Wen | H05K 5/0017 |

FOREIGN PATENT DOCUMENTS

| | | |
|---|---|---|
| CN | 102228321 B | 11/2012 |
| CN | 206197174 U | 5/2017 |
| TW | M356401 U | 5/2009 |

* cited by examiner

*Primary Examiner* — Corey N Skurdal

(74) *Attorney, Agent, or Firm* — Rabin & Berdo, P.C.

(57) ABSTRACT

A head-mounted display device includes a wearable device, a display and a linkage device. The wearable device is worn on a human head. The display includes a case for covering a human's eyes and face, and two guide grooves separately formed on the same side of the case. One end of the linkage device is slidably received within the guide grooves, the other end thereof is pivotally connected to the wearable device.

10 Claims, 12 Drawing Sheets

HEAD-MOUNTED DISPLAY DEVICE

RELATED APPLICATIONS

This application claims priority to Taiwan Application Serial Number 107101096, filed Jan. 11, 2018, which is herein incorporated by reference.

BACKGROUND

Field of Disclosure

The present disclosure relates to a display device. More particularly, the present disclosure relates to a head-mounted display device.

Description of Related Art

With the improvement of technology, a head-mounted display device for virtual reality (VR) has been launched to the market. A user wearing the head-mounted display device can watch a virtual world of three-dimensional space reproduced by computer simulation through the head-mounted display device, and when the user turns, a new virtual-image field in the virtual world of the three-dimensional space can be instantly provided so as to enhance a real-world viewing experience of the user.

Currently, when a head-mounted display device is worn by a user, the head-mounted display device is worn on a head of the user with a headband so that a display of the head-mounted display device can tightly contact and be fit on the face of the user. However, when the display of the head-mounted display device is upwardly removed from the human head, the display sometimes collides with the user's glasses on their face or rubs against the skin of the user's face, which may cause inconvenience to the user and reduce the usage willingness thereof.

Therefore, how to develop a solution to effectively overcome the aforementioned inconveniences and disadvantages is an urgent and important topic for the industry.

SUMMARY

According to one embodiment, a head-mounted display device is provided. The head-mounted display device includes a wearable device, a display and a linkage device. The wearable device is worn on a human head. The display includes a case and two guide grooves. The case is used to cover human eyes. The guide grooves are separately formed on the same side of the case. One end of the linkage device is slidably received within the guide grooves, the other end of the linkage device is pivotally connected to the wearable device. When the case slides relative to the linkage device, the case gradually moves away from the human eyes.

According to one or more embodiments of the disclosure, in the head-mounted display device, the linkage device includes two moving bushings and two brackets. The moving bushings are slidably received within the guide grooves, respectively. The brackets are parallel to each other. One end of each of the brackets is pivotally connected to one side of the wearable device, and the other end of each of the brackets is rotatably connected to one of the moving bushings.

According to one or more embodiments of the disclosure, in the head-mounted display device, the case is provided with a front side, a rear side opposite to the front side, and a viewing recess formed on the rear side for receiving the human eyes. Each of the guide grooves includes a linear region. Long-axis directions of the linear regions of the guide grooves are parallel to each other, and each of the long-axis directions intersections the rear side and the front side of the case. When the moving bushings synchronously slide towards the rear side of the case in the linear regions of the guide grooves, respectively, the case gradually moves away from the human eyes.

According to one or more embodiments of the disclosure, in the head-mounted display device, each of the guide grooves further includes an arc region adjoining to the linear region, and the arc region is disposed between the linear region and the rear side of the case, a planar height of a part of the arc region is lower than a planar height of the linear region. When the moving bushings synchronously slide towards the rear side of the case in the arc regions of the guide grooves, respectively, the case gradually rises to a planar height of the wearable device.

According to one or more embodiments of the disclosure, in the head-mounted display device, the display further includes two stop blocks and a connecting rod. The stop blocks are separately and fixedly connected in the case, and respectively correspond to two opposite ends of one of the guide grooves. The connecting rod disposed in the case, and coupled to the moving bushings for selectively abutting against one of the stop blocks to temporarily stop the moving bushings.

According to one or more embodiments of the disclosure, in the head-mounted display device, each of the stop blocks includes a block body, an elongated slot and at least one protrusion. The block body is securely connected in the case. The elongated slot is formed on one side of the block body to form an elastic rib having a free end. The protrusion is convexly formed on one surface of the elastic rib opposite to the elongated slot for abutting against one end of the connecting rod.

According to one or more embodiments of the disclosure, in the head-mounted display device, as the protrusion is plural, the protrusions are arranged on the surface of the elastic rib in a single row along each of the long-axis directions. One of the stop blocks having the protrusions is closer to the front side of the case than the other stop block.

According to one or more embodiments of the disclosure, in the head-mounted display device, the linkage device includes a damping pivot member, and one of the brackets is pivotally connected to the wearable device through the damping pivot member.

According to one or more embodiments of the disclosure, in the head-mounted display device, the linkage device includes two slidable members, and each of the slidable members surrounds one of the moving bushings to be sandwiched between the case and one of the brackets.

According to another embodiment, a head-mounted display device is provided. The head-mounted display device includes a wearable device, a display, two first brackets, two second brackets and a connecting rod. The display includes two stop blocks arranged opposite to each other. The first brackets are collectively disposed on one side of the display in parallel. One end of each of the first brackets is pivotally connected to one side of the wearable device, and the other end of each of the first brackets is slidably connected to the one side of the display. The second brackets are collectively disposed on the other side of the display in parallel. One end of each of the second brackets is pivotally connected to the other side of the wearable device, and the other end of each of the second brackets is slidably connected to the other side of the display. The connecting rod is coupled to the first brackets for selectively abutting against one of the two stop blocks to limit a position of the display temporarily.

Thus, with the aforementioned structure of the embodiments above, when the display is upwardly taken off from the human head by a user, the disclosure not only prevents the glasses from falling and damage due to collision to the display, but also reduces the chances of injury to the user's face skin. Thereby, not only inconvenience will not cause to the user, but also the usage willingness can be increased.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
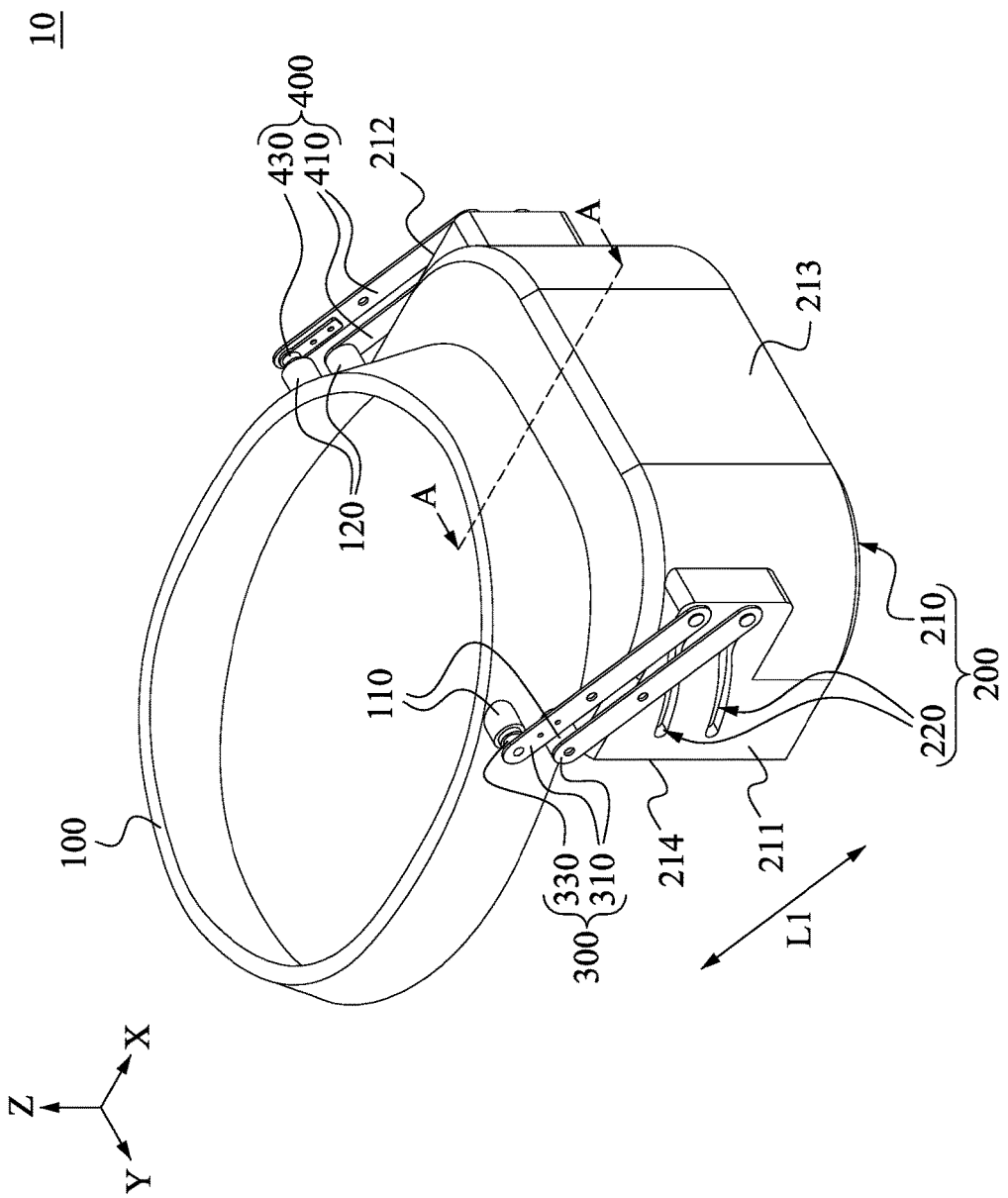
FIG. 1 is a perspective view of a head-mounted display device according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

In a situation which the conventional head-mounted display device is upwardly taken off from the human head of a user, the conventional head-mounted display device may collide with the user's glasses or the skin of the user's face so as to cause inconvenience to the user and reduce the willingness of usage of the user, thus, a head-mounted display device is provided in the disclosure. The head-mounted display device includes a wearable device, a display and a linkage device in which one end of the linkage device is slidably connected to the display, and the other end of the linkage device is pivotally connected to the wearable device. Therefore, when a user would like to remove the head-mounted display device upwards from the human head of the user, because the display can be straightly slid away from the human head relative to the linkage device, the head-mounted display device not only prevents the glasses of the user from falling and damage after the glasses of the user collide with the display, but also reduces the risk of injury to the skin of the user's face.

Figure 2:
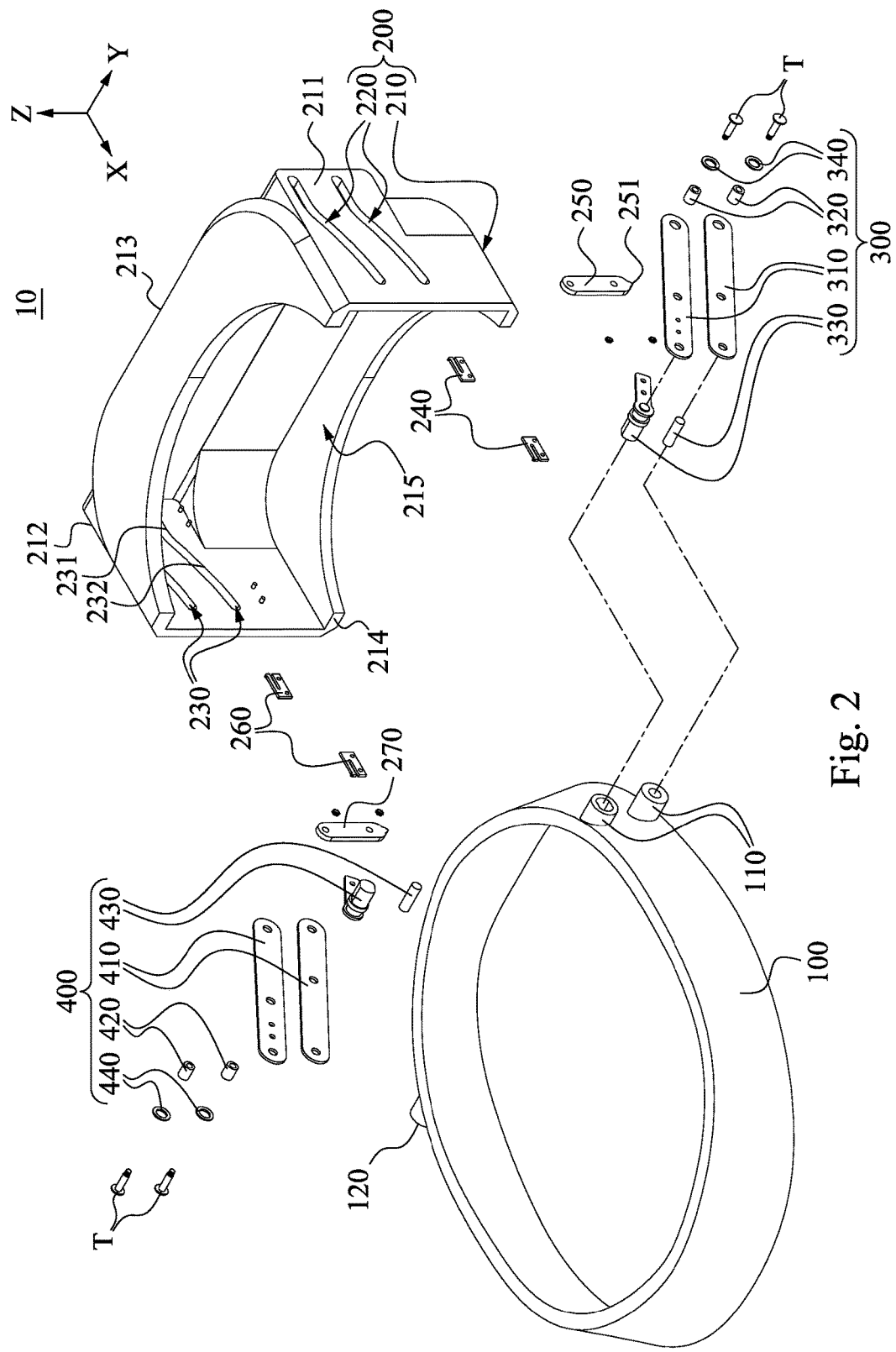
FIG. 2 is an exploded view of the head-mounted display device of FIG. 1.

Reference is now made to FIG. 1 and FIG. 2 in which FIG. 1 is a perspective view of a head-mounted display device 10 according to one embodiment of the disclosure, and FIG. 2 is an exploded view of the head-mounted display device 10 of FIG. 1. As shown in FIG. 1 and FIG. 2, the head-mounted display device 10 includes a wearable device 100, a display 200, a first linkage device 300 and a second linkage device 400. The display 200 includes a case 210, two first guide grooves 220 and two second guide grooves 230. The case 210 is used for receiving a display panel (not shown in figures). The first guide grooves 220 and the second guide grooves 230 are respectively formed on two opposite sides of the case 210 in which the first guide grooves 220 are collectively formed on one side of the case 210, and are separately arranged, and the second guide grooves 230 are collectively formed on the other side of the case 210, and are separately arranged. The first linkage device 300 and the second linkage device 400 are respectively formed on two opposite sides of the case 210, and the first linkage device 300 and the second linkage device 400 are also respectively formed on two opposite sides of the wearable device 100. That is, the wearable device 100 and the case 210 are collectively located between the first linkage device 300 and the second linkage device 400. One end of the first linkage device 300 is slidably received within the first guide grooves 220, and the other end of the first linkage device 300 is pivotally connected to one side of the wearable device 100. One end of the second linkage device 400 is slidably received within the second guide grooves 230, and the other end of the second linkage device 400 is pivotally connected to the other side of the wearable device 100. The wearable device 100 for example, is a head band.

In specific, the first linkage device 300 includes two first brackets 310, two first moving bushings 320 and two first pivoting members 330. The first moving bushings 320 are slidably received within the first guide grooves 220, and the first moving bushings 320 are parallel to each other, that is, long-axis directions (e.g., longitudinal direction as axis Y) of the first moving bushings 320 are parallel to each other. The first brackets 310 are parallel to each other, that is, long-axis directions L1 of the first brackets 310 are parallel to each other. One end of each of the first brackets 310 is pivotally connected to a pivotal portion 110 disposed on one side of the wearable device 100 through one of the first pivoting members 330. The other end of each of the first brackets 310 is rotatably connected to one of the first moving bushings 320 through a bolt T. The second linkage device 400 includes two second brackets 410, two second moving bushings 420 and two second pivoting members 430. The second moving bushings 420 are slidably received within the second guide grooves 230, and the second moving bushings 420 are parallel to each other, that is, long-axis directions (e.g., longitudinal direction as axis Y) of the second moving bushings 420 are parallel to each other. The second brackets 410 are parallel to each other, that is, long-axis directions L1 of the second brackets 410 are parallel to each other. One end of each of the second brackets 410 is pivotally connected to a pivotal portion 120 disposed on the other side of the wearable device 100 through one of the second pivoting members 430. The other end of each of the second brackets 410 is rotatably connected to one of the second moving bushings 420 through another bolt T.

Furthermore, in the embodiment, at least one of the first pivoting members 330 and at least one of the second pivoting members 430 are damping pivot members, respectively. The damping pivot member has a damper (not shown in the figures) therein for slowing the rotation speed of the first brackets 310 and the second brackets 410 rotated relative to the wearable device 100, thereby reducing the risk of the display 200 instantly dropping to cause injury to the user, however, the disclosure is not limited to that the first pivoting member 330 and the second pivoting member 430 must be the damping pivot members.

Figure 3:
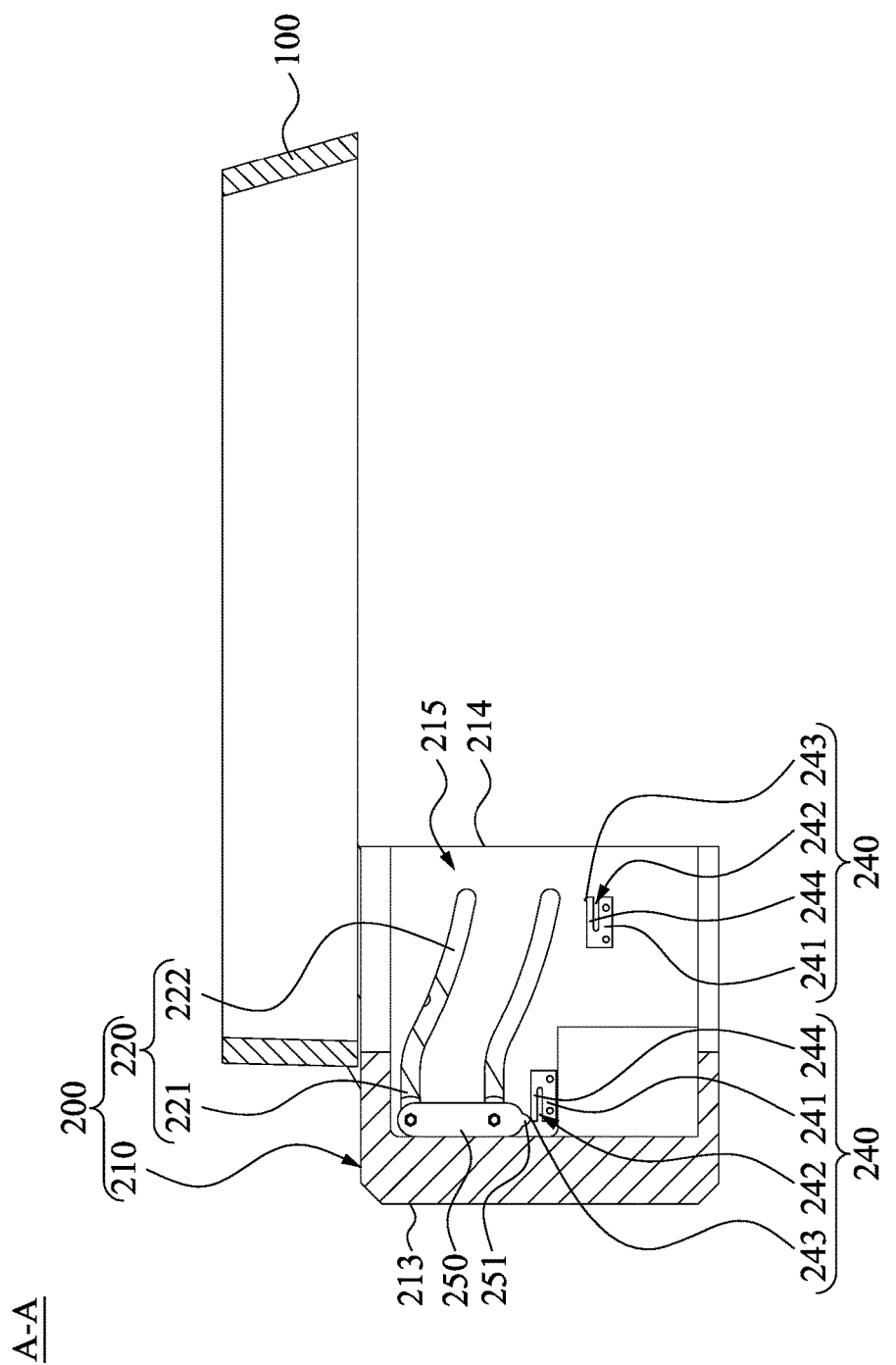
FIG. 3 is a cross sectional view of FIG. 1 viewed along a line A-A.

FIG. 3 is a cross sectional view of FIG. 1 viewed along a line A-A. As shown in FIG. 2 and FIG. 3, in the embodiment, the case 210 is provided with a first side 211, a second side 212, a front side 213, a rear side 214 and a viewing recess 215. The front side 213 and the rear side 214 of the case 210 are arranged opposite to each other, and the first side 211 and the second side 212 are arranged opposite to each other. The first side 211 of the case 210 adjoins the front side 213 and the rear side 214 of the case 210, and the second side 212 of the case 210 also adjoins the front side 213 and the rear side 214 of the case 210. The viewing recess 215 is formed on the rear side 214 for receiving the human eyes E to watch the display panel (not shown in the figures) mentioned above. The first guide grooves 220 are formed on the first side 211 of the case 210, and the second guide grooves 230 are formed on the second side 212 of the case 210. For example, the first guide grooves 220 and the second guide grooves 230 are in communication with the viewing recess 215, respectively.

Specifically, each of the first guide grooves 220 includes a first linear region 221 and a first arc region 222. The first linear regions 221 of the two first guide grooves 220 are parallel to each other, that is, long-axis directions (e.g., axis X) of the first linear regions 221 are parallel to each other. Each of the long-axis directions (e.g., axis X) of the first linear regions 221 intersections the rear side 214 and the front side 213 of the case 210. The first linear region 221 adjoins to the first arc region 222, and the first linear region 221 is disposed between the first arc region 222 and the front side 213 of the case 210, and the first arc region 222 is disposed between the first linear region 221 and the rear side 214 of the case 210. As shown in FIG. 2 and FIG. 3, a planar height of a part of the first arc region 222 is lower than a planar height of the first linear region 221. However, the disclosure is not limited thereto.

Each of the second guide grooves 230 includes a second linear region 231 and a second arc region 232 (FIG. 2). The two second linear regions 231 of the second guide grooves 230 are parallel to each other, that is, long-axis directions (e.g., axis X) of the second linear regions 231 are parallel to each other. Each of the long-axis directions (e.g., axis X) of the second linear regions 231 intersections the rear side 214 and the front side 213 of the case 210. The second linear region 231 adjoins to the second arc region 232, and the second linear region 231 is disposed between the second arc region 232 and the front side 213 of the case 210, and the second arc region 232 is disposed between the second linear region 231 and the rear side 214 of the case 210. A planar height of a part of the second arc region 232 is lower than a planar height of the second linear region 231. However, the disclosure is not limited thereto.

The display 200 further includes two first stop blocks 240 and a first connecting rod 250. The first stop blocks 240 are separately and fixedly connected to an inner wall of the case 210, and the first stop blocks 240 respectively correspond to two opposite ends of the first guide grooves 220. One of the first stop blocks 240 is arranged to align one of two opposite ends of the first guide groove 220, the other first stop block 240 is arranged to align the other end of the first guide groove 220. The first connecting rod 250 is disposed on the inner wall of the case 210 to cover the first guide grooves 220, and the first connecting rod 250 is coupled to the first moving bushings 320. The first connecting rod 250 selectively abuts against anyone of the first stop blocks 240 to temporarily stop the first moving bushings 320. A long-axis direction (e.g., axis Z) of the first connecting rod 250 intersections a long-axis direction L1 (FIG. 1) of one of the first brackets 310.

Specifically, each of the first stop blocks 240 includes a first block body 241, a first elongated slot 242 and a first protrusion 243. The first block body 241 is securely connected to the inner wall of the case 210, for example, the first block body 241 is secured in the viewing recess 215. The first elongated slot 242 is formed on one side of the first block body 241 to form a first elastic rib 244 on the first block body 241, and the first elastic rib 244 has a free end. The first protrusion 243 is convexly formed on one surface of the first elastic rib 244 opposite to the first elongated slot 242 for abutting against one end of the first connecting rod 250. Furthermore, the first elongated slot 242 of one of the first stop blocks 240 which is closer to the front side 213 of the case 210 faces towards the front side 213 of the case 210, and another first elongated slot 242 of the other first stop block 240 which is closer to the rear side 214 of the case 210 faces towards the rear side 214 of the case 210.

Figure 4:
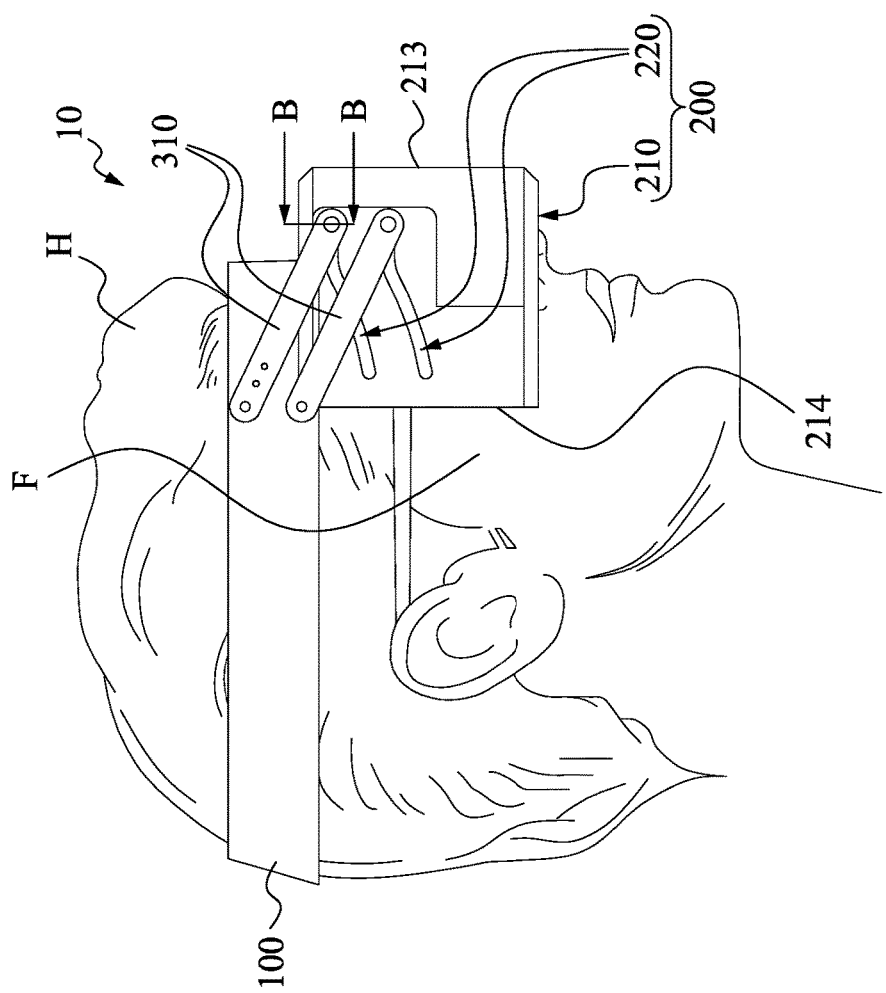
FIG. 4 is a first operational schematic diagram of the head-mounted display device of FIG. 1 while worn by a user.

FIG. 4 is a first operational schematic diagram of the head-mounted display device 10 of FIG. 1 while worn by a user. As shown in FIG. 3 and FIG. 4, in the embodiment, when a user wears and uses the head-mounted display device 10, the wearable device 100 is worn on a human head H of the user, the case 210 of the display 200 is located under the wearable device 100, and the case 210 of the display 200 covers the human eyes (not shown in figures) to contact the face skin F of the user with the rear side 214 of the case 210. Thus, the head-mounted display device 10 at this moment is in a use state. As the head-mounted display device 10 in the use state, the first protrusion 243 of the first elastic rib 244 which is closer to the front side 213 of the case 210 abuts against a tip 251 of the first connecting rod 250. Thus, the position of the first moving bushings 320, the first brackets 310 and the case 210 can be temporarily limited so as to further stabilize the position of the display 200 relative to the user.

Figure 5A:
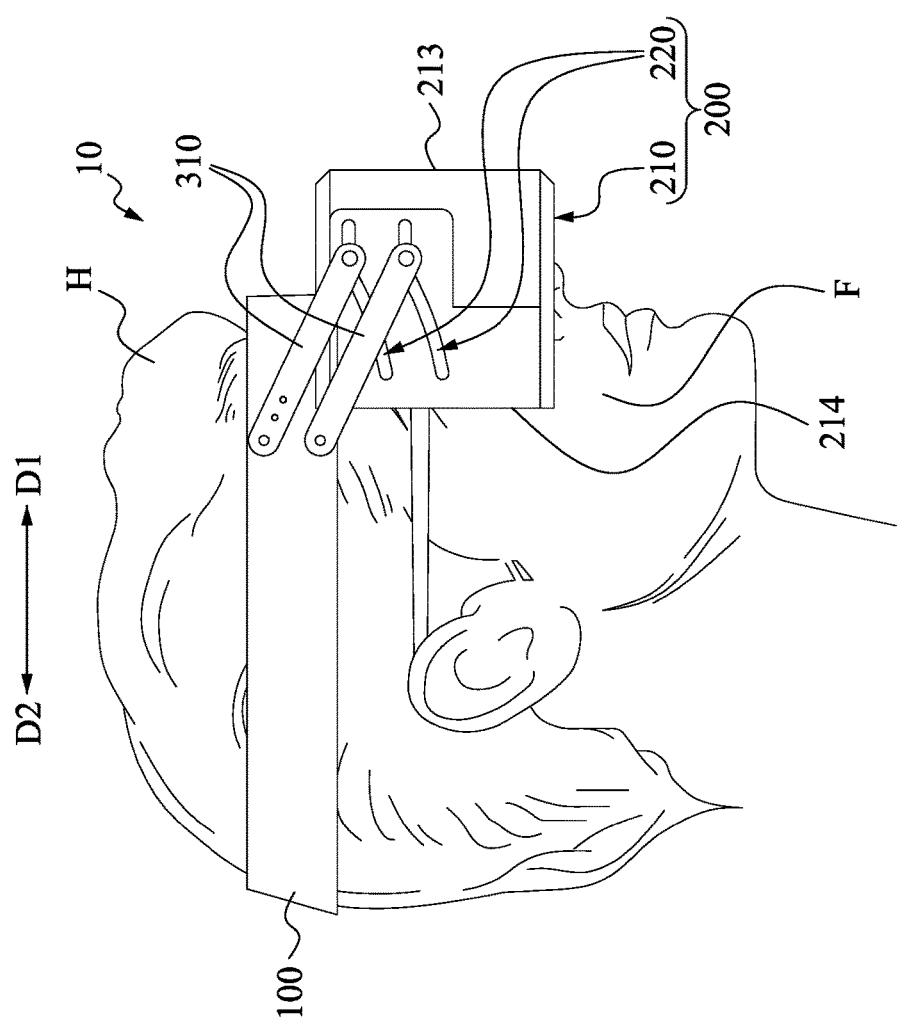
FIG. 5A is a second operational schematic diagram of the head-mounted display device of FIG. 1 while worn by a user.
Figure 5B:
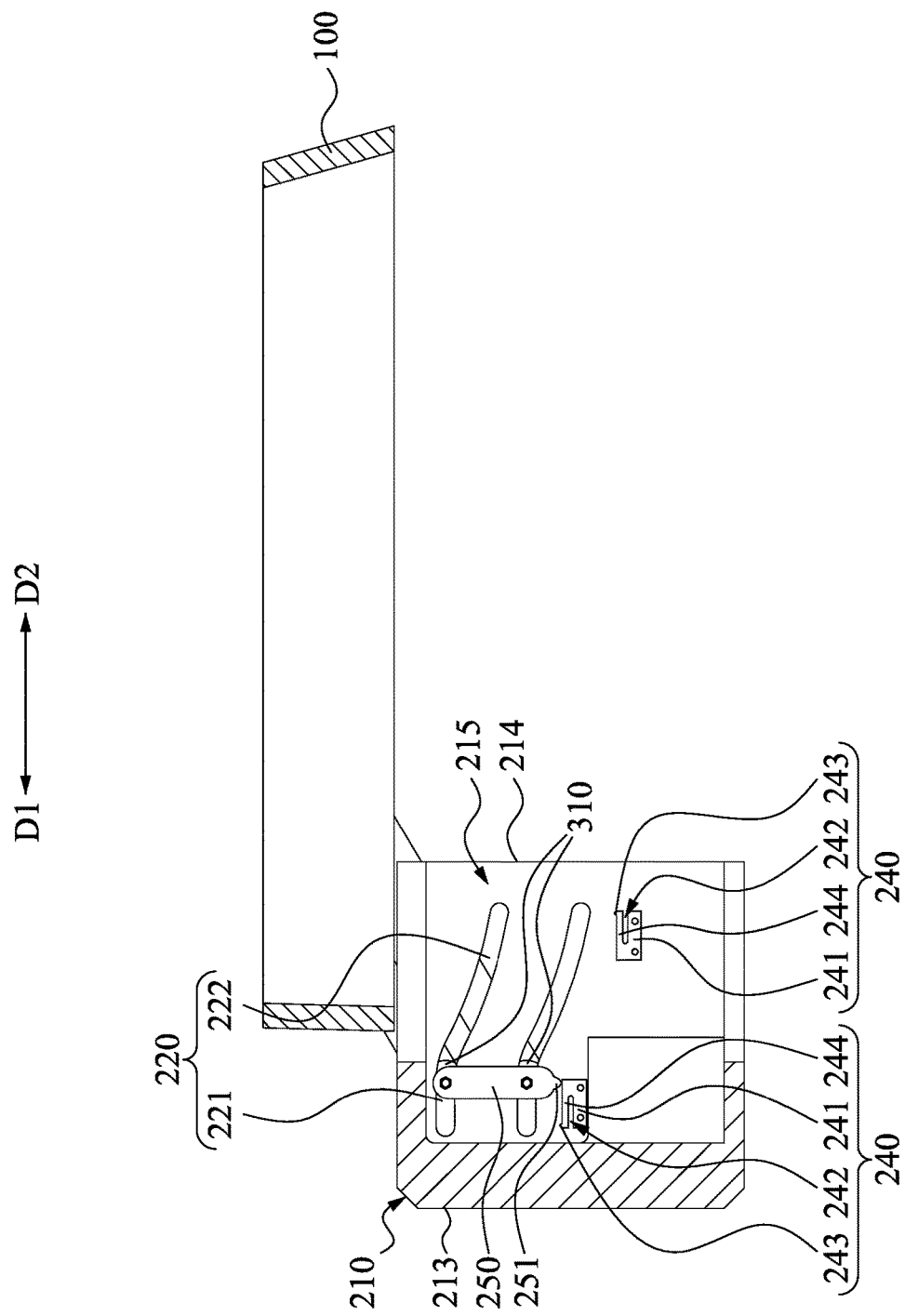
FIG. 5B is a cross sectional view of the head-mounted display device of FIG. 5A.

FIG. 5A is a second operational schematic diagram of the head-mounted display device 10 of FIG. 1 while worn by a user, and FIG. 5B is a cross sectional view of the head-mounted display device 10 of FIG. 5A. As shown in FIG. 5A and FIG. 5B, when the user would like to take off the head-mounted display device 10 in the use state, the user first pushes the case 210 relative to the first linkage device 300 and the second linkage device 400 to slide horizontally in a direction D1, that is, the first moving bushings 320 and the second moving bushings 420 are relatively moved to approach the rear side 214 of the case 210 in a direction D2 which is directed to the rear side 214 of the case 210. Accordingly, the case 210 is horizontally moved away from the human eyes (not shown in figures) gradually in the direction D1 to leave the human eyes and the face skin of the user. Therefore, the head-mounted display device 10 at this moment is in a sliding-away state. Specifically, when the first moving bushings 320 and the second moving bushings 420 synchronously slide in the direction D2 along the first linear regions 221 and the second linear regions 231, the case 210 gradually leaves the wearable device 100 horizontally.

Figure 6A:
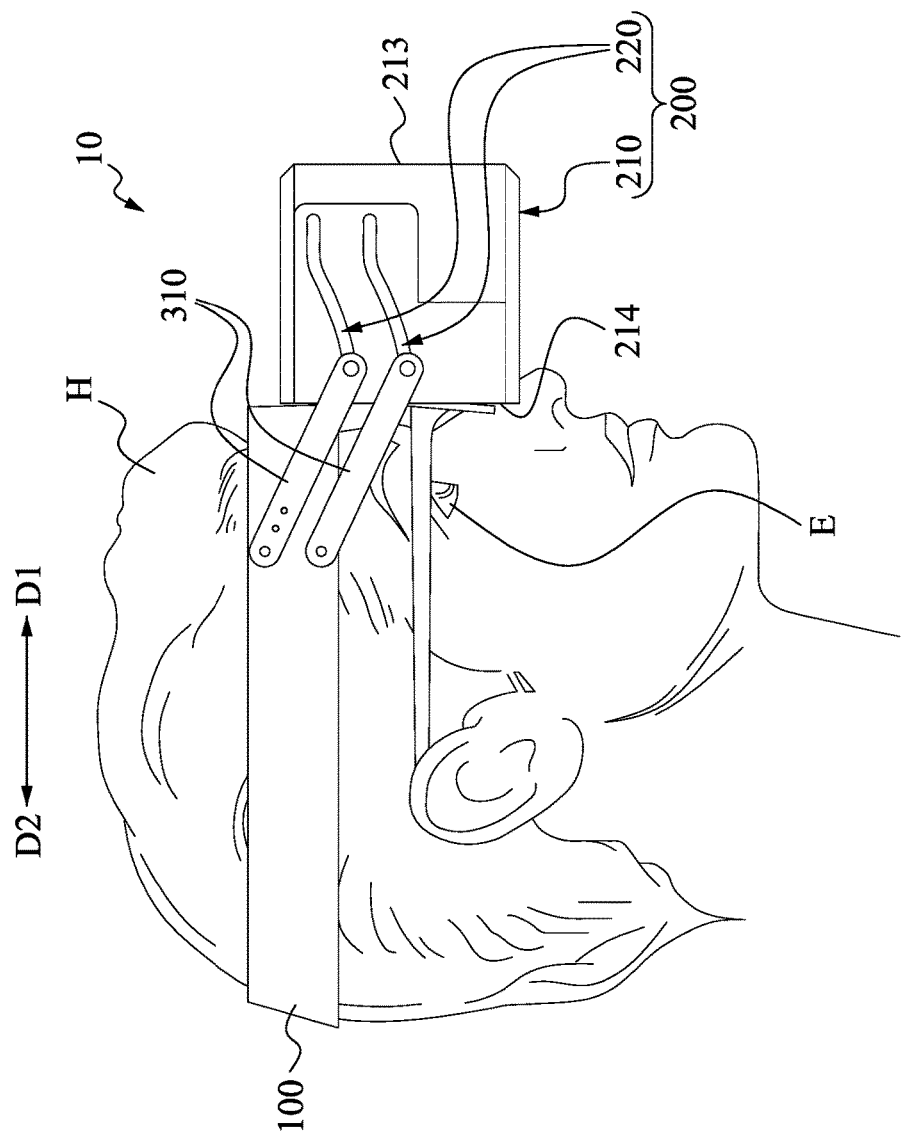
FIG. 6A is a third operational schematic diagram of the head-mounted display device of FIG. 1 while worn by a user.
Figure 6B:
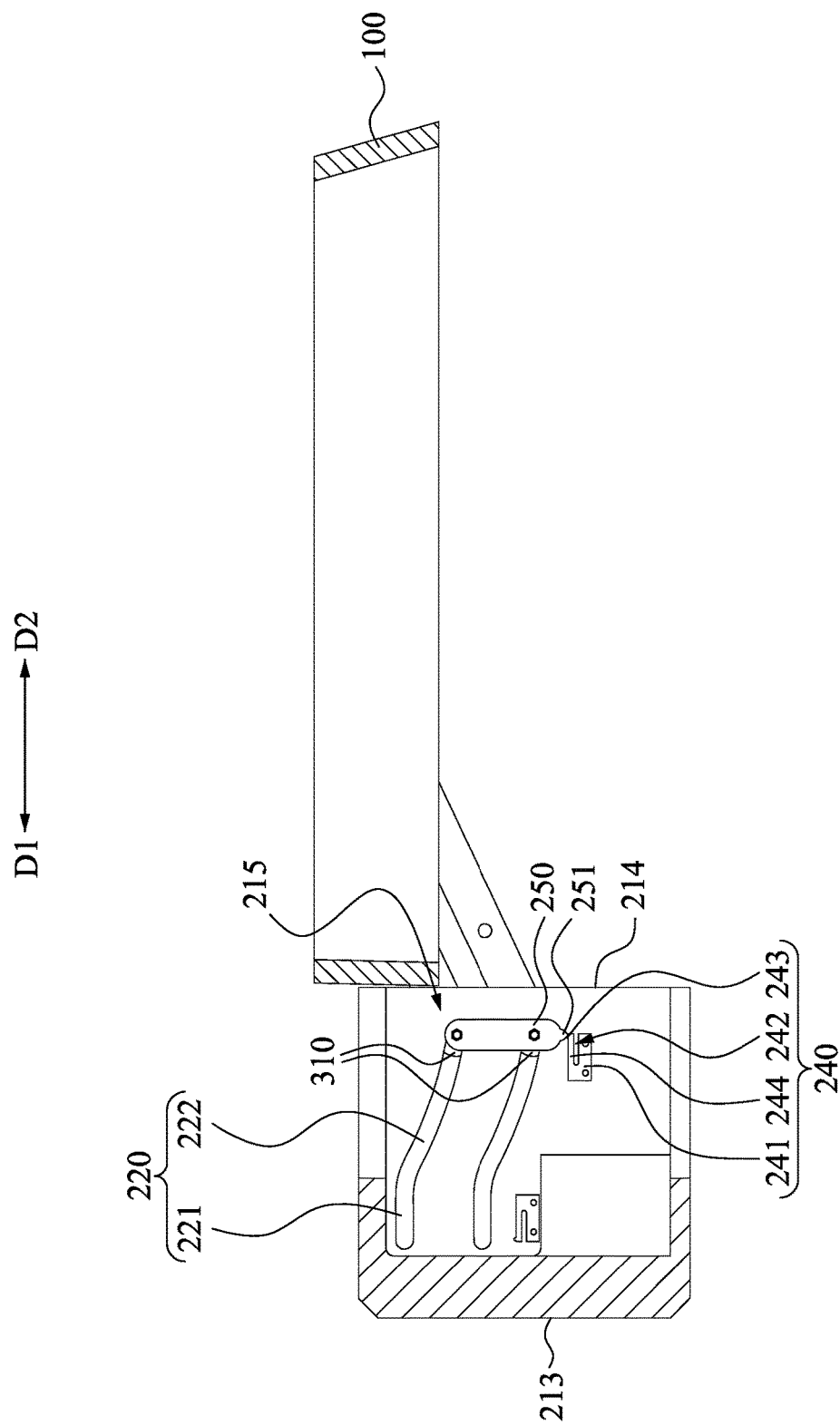
FIG. 6B is a cross sectional view of the head-mounted display device of FIG. 6A.

FIG. 6A is a third operational schematic diagram of the head-mounted display device 10 of FIG. 1 while worn by a user, and FIG. 6B is a cross sectional view of the head-mounted display device 10 of FIG. 6A. As shown in FIG. 6A and FIG. 6B, when the user continues to slide the case 210 relative to the first linkage device 300 and the second linkage device 400 in the direction D1 in the sliding-away state, that is, the first moving bushings 320 and the second moving bushings 420 are synchronously moved in the direction D2 in the first arc regions 222 and the second arc regions 232, respectively, the case 210 is slightly lifted to a planar height as same as the wearable device 100. Accordingly, the case 210 can be farther away from the human eye E. Thus, the head-mounted display device 10 at this moment is in a slightly-lifted state.

It is noted, as the head-mounted display device 10 in the slight-lifted state, the first protrusion 243 of the other of the first elastic ribs 244 which is closer to the rear side 214 of the case 210 abuts against the tip 251 of the first connecting rod 250 to temporarily limit the position of the first moving bushings 320, the first brackets 310 and the case 210 so as to further stabilize the position of the display 200 relative to the user.

Figure 7:
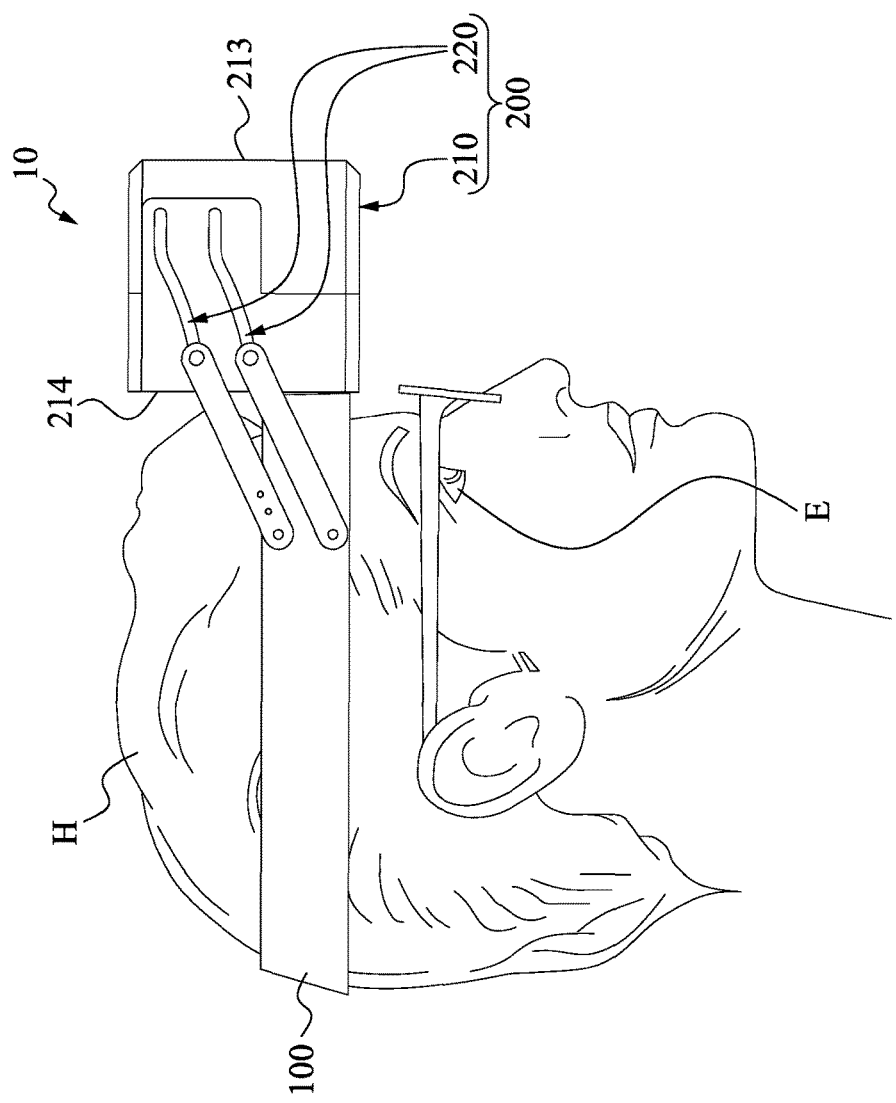
FIG. 7 is a fourth operational schematic diagram of the head-mounted display device of FIG. 1 while worn by a user.

FIG. 7 is a fourth operational schematic diagram of the head-mounted display device 10 of FIG. 1 while worn by a user. As shown in FIG. 6B and FIG. 7, the user still can rotate the first brackets 310 and the second brackets 410 (FIG. 1) relative to the case 210 so that the display 200 of the head-mounted display device 10 is moved above the human head H of the user. When the display 200 is above the human head H of the user, see FIG. 6B as a reference, the tip 251 of the first connecting rod 250 still abuts against the first protrusion 243 of the first elastic rib 244 closer to the rear side 214 of the case 210 thereby reducing the risk that the display 200 unexpectedly falls.

Figure 8:
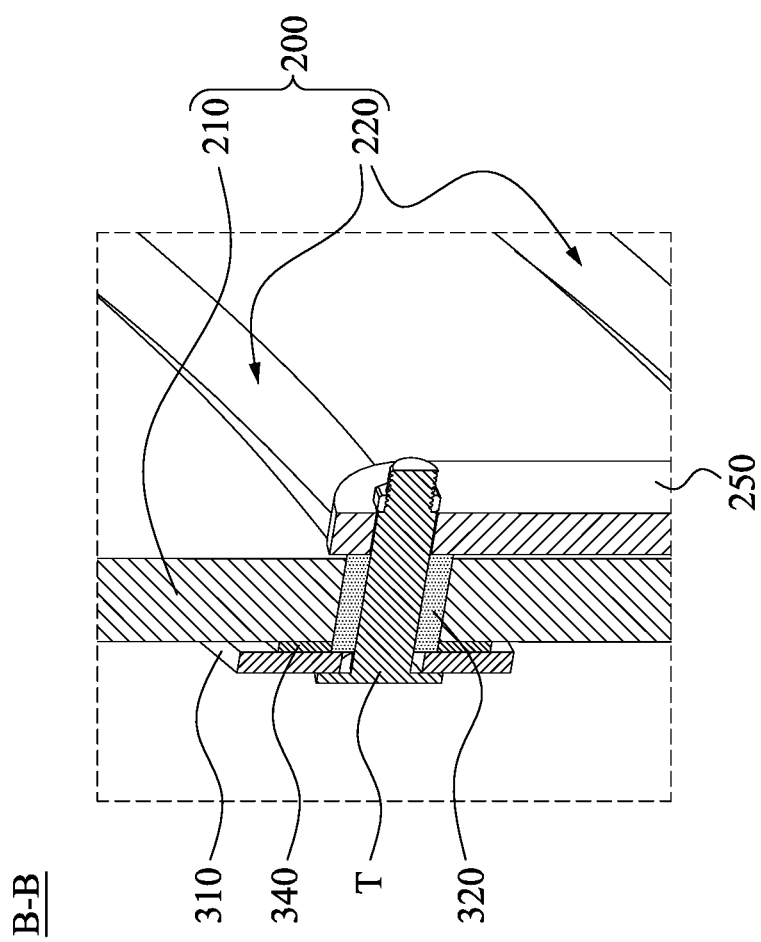
FIG. 8 is a partial cross sectional view of FIG. 4 viewed along a line B-B.

FIG. 8 is a partial cross sectional view of FIG. 4 viewed along a line B-B. As shown in FIG. 2 and FIG. 8, the first linkage device 300 includes two first slidable members 340. Each of the first slidable members 340 surrounds one of the first moving bushings 320 to be directly sandwiched between case 210 and one of the first brackets 310 so as to avoid the case 210 from being shaken relative to the first bracket 310, and to avoid abrasion to the first bracket 310 by the case 210. Each of the first slidable members 340 for example is a bearing, a washer or a similar element having low friction coefficient material. The material of the washer for example is the material of Teflon or other abrasion proof material.

Figure 9:
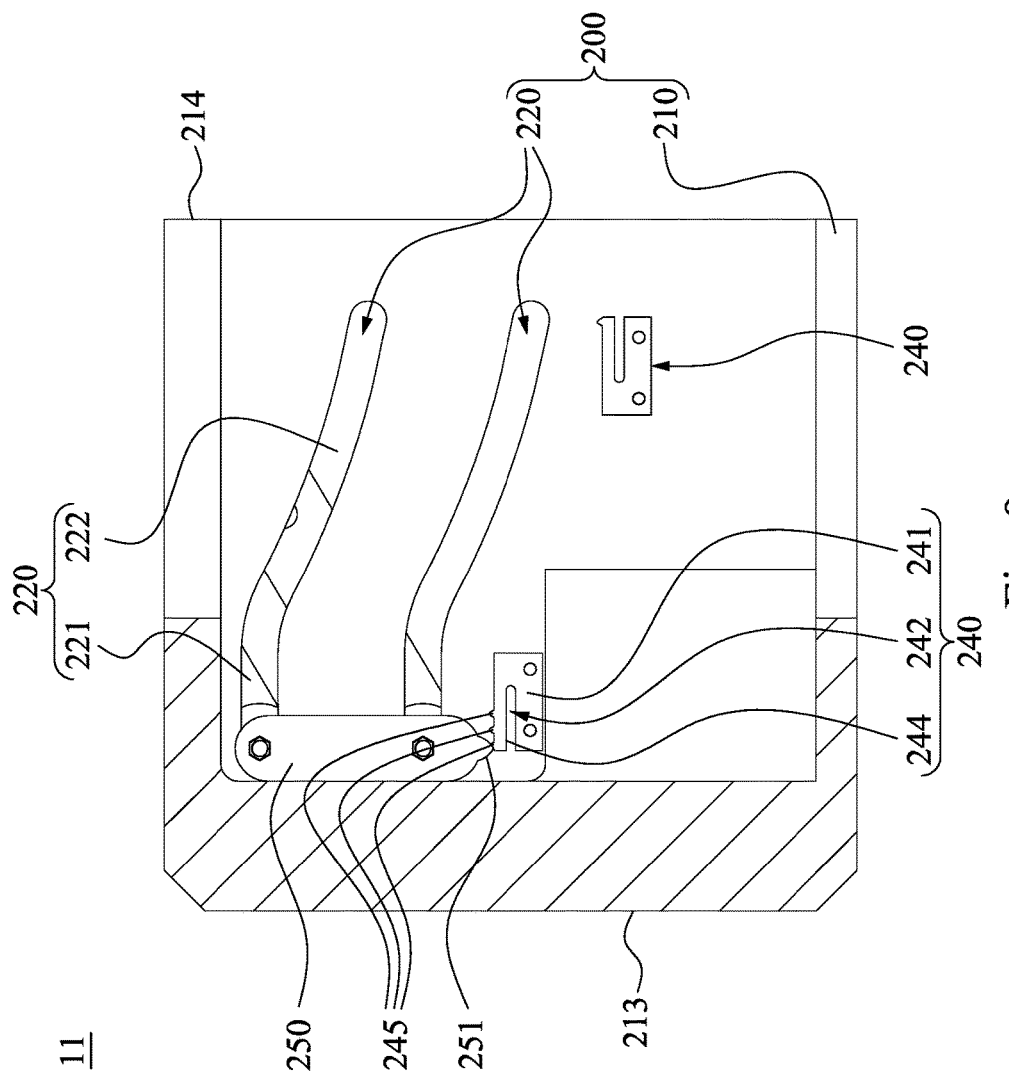
FIG. 9 is a cross sectional view of the head-mounted display device according to one embodiment of the disclosure in which the cross-sectional line of FIG. 9 is the same as the cross-sectional line of FIG. 3.

FIG. 9 is a cross sectional view of the head-mounted display device 11 according to one embodiment of the disclosure in which the cross-sectional line of FIG. 9 is the same as the cross-sectional line of FIG. 3. As shown in FIG. 3 and FIG. 9, the head-mounted display device 11 of FIG. 9 and the head-mounted display device 10 of FIG. 3 are substantially the same, in which the same elements are labeled with the same numerical references in FIG. 9. However, at least one difference of the head-mounted display device 11 of FIG. 9 from the head-mounted display device 10 of FIG. 3 is that, each of the first stop blocks 240 includes a plurality of first protrusions 245. The first protrusions 245 are arranged on the top surface of the first elastic rib 244 in a single row along the long-axis direction of the first linear regions 221. Thus, as in the use state, the head-mounted display device 11 provides a multi-stage position adjustment for adjusting the relative position of the case 210 of the display 200 to the face skin F of the user. Furthermore, one of the first stop blocks 240 having the first protrusions 245 is closer to the front side 213 of the case 210 than the other first stop block 240.

Figure 10:
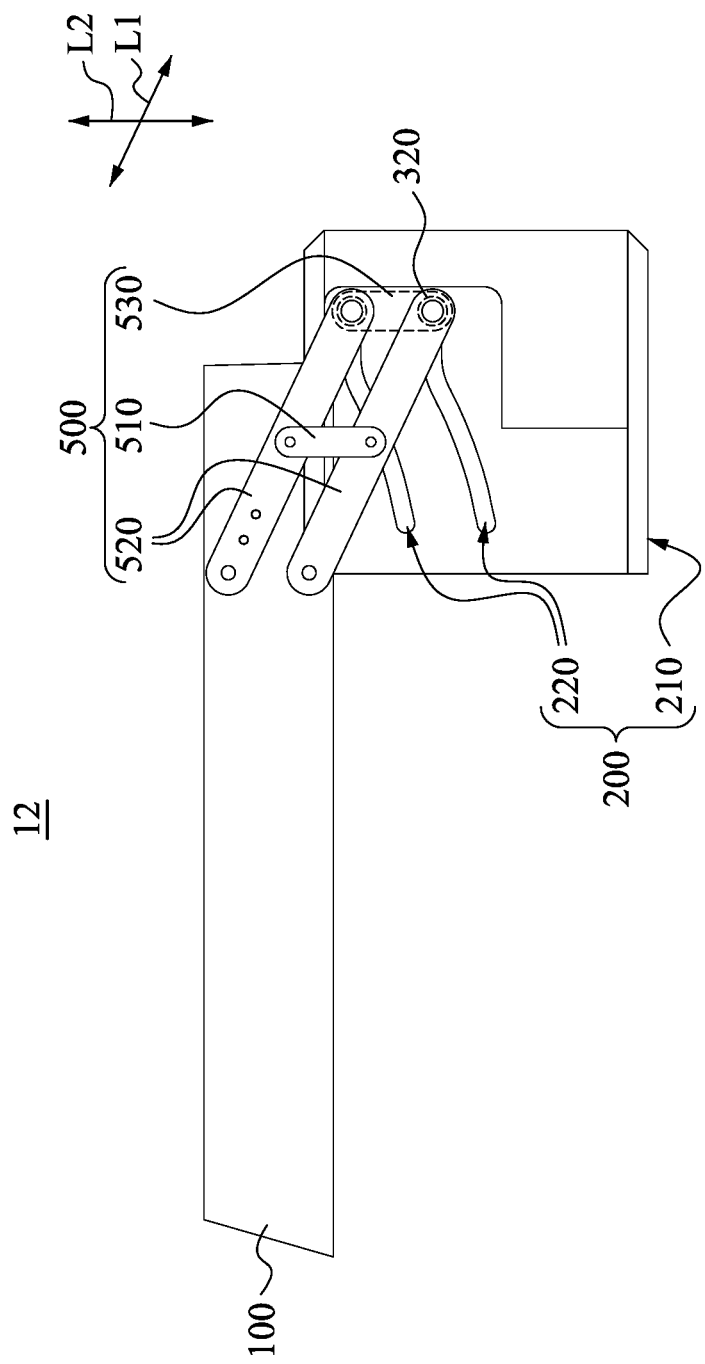
FIG. 10 is a side view of a head-mounted display device according to one embodiment of the disclosure.

FIG. 10 is a side view of a head-mounted display device 12 according to one embodiment of the disclosure. As shown in FIG. 1 and FIG. 10, the head-mounted display device 12 of FIG. 10 and the head-mounted display device 10 of FIG. 1 are substantially the same, in which the same elements are labeled with the same numerical references in FIG. 10. However, at least one difference of the head-mounted display device 12 of FIG. 10 from the head-mounted display device 10 of FIG. 1 is that, the first linkage device further includes a first cross bar 510. A long-axis direction L2 of the first cross bar 510 intersections the long-axis direction L1 of one of the first brackets 520, and the first cross bar 510 can be more stabilized the synchronous operation of the first brackets 520. Since two opposite ends of the first cross bar 510 are respectively pivotally connected to the first brackets 520, the first connecting rod 530 is coupled to the first brackets 520 through the first moving bushings 320 (FIG. 2). Therefore, the first brackets 520, the first connecting rod 530 and the first cross bar 510 mutually form a first four-bar linkage 500.

Similarly, the second linkage device further includes a second cross bar (not shown in figures) so that the second brackets, the second connecting rod and the second cross bar mutually form a second four-bar linkage (not shown in figures). The second four-bar linkage device and the first four-bar linkage device 500 described above are substantially the same in structure, number, and position. Refer to the first four-bar linkage device 500 in FIG. 10, and the details of the second four-bar linkage device are not described herein again.

It is noted, in all above embodiments, as shown in FIG. 2, the display 200 further includes two second stop blocks 260 and a second connecting rod 270. Each of the second stop blocks 260 and one of the first stop blocks 240 described above are substantially the same in structure, number, and position. The second connecting rod 270 and the first connecting rod 250 described above are substantially the same in structure, number and position, as shown in FIG. 3 and FIG. 6 as a reference, thus, the details thereof are not described herein again. In addition, refer to FIG. 2, the second linkage device 400 also includes two second slidable members 440. Each of the second slidable members 440 and one of the first slidable members 340 described above are substantially the same in structure, number and position, as shown in FIG. 8 as a reference, the details thereof are not described herein again.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A head-mounted display device, comprising:
a wearable device for being worn on a human head;
a display, comprising:
a case for covering human eyes; and
two guide grooves which are separately formed on the same side of the case; and
a linkage device in which one end of the linkage device is slidably received within the two guide grooves, the other end of the linkage device is pivotally connected to the wearable device,
wherein, when the case slides relative to the linkage device, the case gradually moves away from the human eyes.

2. The head-mounted display device of claim 1, wherein the linkage device comprising:
two moving bushings slidably received within the two guide grooves, respectively; and
two brackets being parallel to each other,
wherein one end of each of the two brackets is pivotally connected to one side of the wearable device, and the other end of each of the two brackets is rotatably connected to one of the two moving bushings.

3. The head-mounted display device of claim 2, wherein the case is provided with a front side, a rear side opposite to the front side, and a viewing recess formed on the rear side for contacting and fitting to the human eyes,
each of the two guide grooves comprises a linear region, and long-axis directions of the linear regions of the two guide grooves are parallel to each other, and each of the long-axis directions intersects the rear side and the front side of the case,
wherein, when the two moving bushings synchronously slide towards the rear side of the case in the linear regions of the two guide grooves, respectively, the case gradually moves away from the human eyes.

4. The head-mounted display device of claim 3, wherein each of the two guide grooves further comprises an arc region adjoining to the linear region, and the arc region is disposed between the linear region and the rear side of the case, a planar height of a part of the arc region is lower than a planar height of the linear region,
wherein, when the two moving bushings synchronously slide towards the rear side of the case in the arc regions of the two guide grooves, respectively, the case gradually rises to a planar height of the wearable device.

5. The head-mounted display device of claim 3, wherein the display further comprises:
two stop blocks separately and fixedly connected in the case, and respectively corresponding to two opposite ends of one of the two guide grooves; and
a connecting rod disposed in the case, and coupled to the two moving bushings for selectively abutting against one of the two stop blocks to temporarily stop the two moving bushings.

6. The head-mounted display device of claim 5, wherein each of the two stop blocks comprises:
a block body securely connected in the case;
an elongated slot formed on one side of the block body to form an elastic rib having a free end; and
at least one protrusion convexly formed on one surface of the elastic rib opposite to the elongated slot for abutting against one end of the connecting rod.

7. The head-mounted display device of claim 6, wherein when the at least one protrusion is plural, the plural protrusions are arranged on the surface of the elastic rib in a single row along each of the long-axis directions,
wherein one of the two stop blocks having the plural protrusions is closer to the front side of the case than the other of the two stop blocks.

8. The head-mounted display device of claim 2, wherein the linkage device comprises:
a damping pivot member in which one of the two brackets is pivotally connected to the wearable device through the damping pivot member.

9. The head-mounted display device of claim 2, wherein the linkage device comprises:
two slidable members in which each of the two slidable members surrounds one of the moving bushings to be sandwiched between case and one of the two brackets.

10. A head-mounted display device, comprising:
a wearable device;
a display comprising two stop blocks arranged opposite to each other;
two first brackets collectively disposed on one side of the display in parallel, wherein one end of each of the first brackets is pivotally connected to one side of the wearable device, and the other end of each of the first brackets is slidably connected to the one side of the display;
two second brackets collectively disposed on the other side of the display in parallel, wherein one end of each of the second brackets is pivotally connected to the other side of the wearable device, and the other end of each of the second brackets is slidably connected to the other side of the display; and
a connecting rod coupled to the two first brackets for selectively abutting against one of the two stop blocks to limit a position of the display temporarily.

* * * * *